(12) United States Patent
Bergen

(10) Patent No.: US 7,506,594 B2
(45) Date of Patent: *Mar. 24, 2009

(54) SEED BOOT OPENER HAVING INTERCHANGEABLE DISPENSERS

(76) Inventor: Henry J. Bergen, P.O. Box 560, 2002 20th Street, Coaldale, Alberta (CA) T1M 1M5

( * ) Notice: Subject to any disclaimer, the term of this patent is extended or adjusted under 35 U.S.C. 154(b) by 263 days.

This patent is subject to a terminal disclaimer.

(21) Appl. No.: 11/467,556

(22) Filed: Aug. 27, 2006

(65) Prior Publication Data

US 2008/0115706 A1    May 22, 2008

Related U.S. Application Data

(62) Division of application No. 10/863,954, filed on Jun. 9, 2004, now Pat. No. 7,096,803.

(51) Int. Cl.
*A01C 7/00*     (2006.01)
*A01C 9/00*     (2006.01)
*A01C 23/00*    (2006.01)

(52) U.S. Cl. ..................... 111/124; 111/188
(58) Field of Classification Search ......... 111/123–125, 111/154–156, 170, 186–188; 172/772, 772.5
See application file for complete search history.

(56) References Cited

U.S. PATENT DOCUMENTS 4,653,412 A * 3/1987 Clarke ..................... 111/150

* cited by examiner

*Primary Examiner*—Christopher J. Novosad
(74) *Attorney, Agent, or Firm*—Peter J. Rashid

(57) ABSTRACT

A seed boot having a modular or replaceable opener removably fastened to the seed boot. The opener is configured in any of several embodiments for discharging a fluent material such as seed in different ways, including narrow single row, wide single row, and double row. A second fluent material such as fertilizer may be dispensed in an additional discharge stream in different embodiments. In some embodiments, two fluent materials may be mixed within the seed boot and dispensed together.

6 Claims, 2 Drawing Sheets

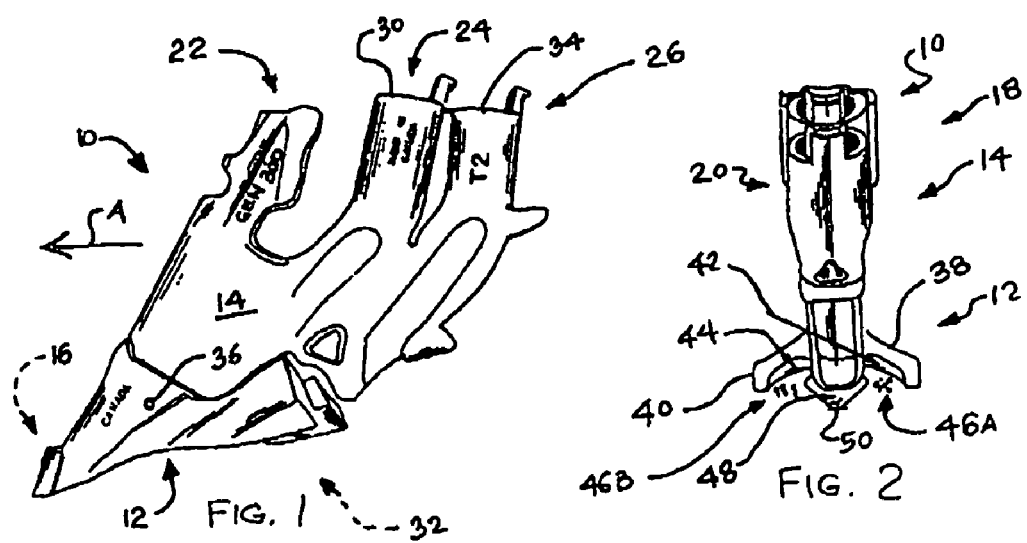

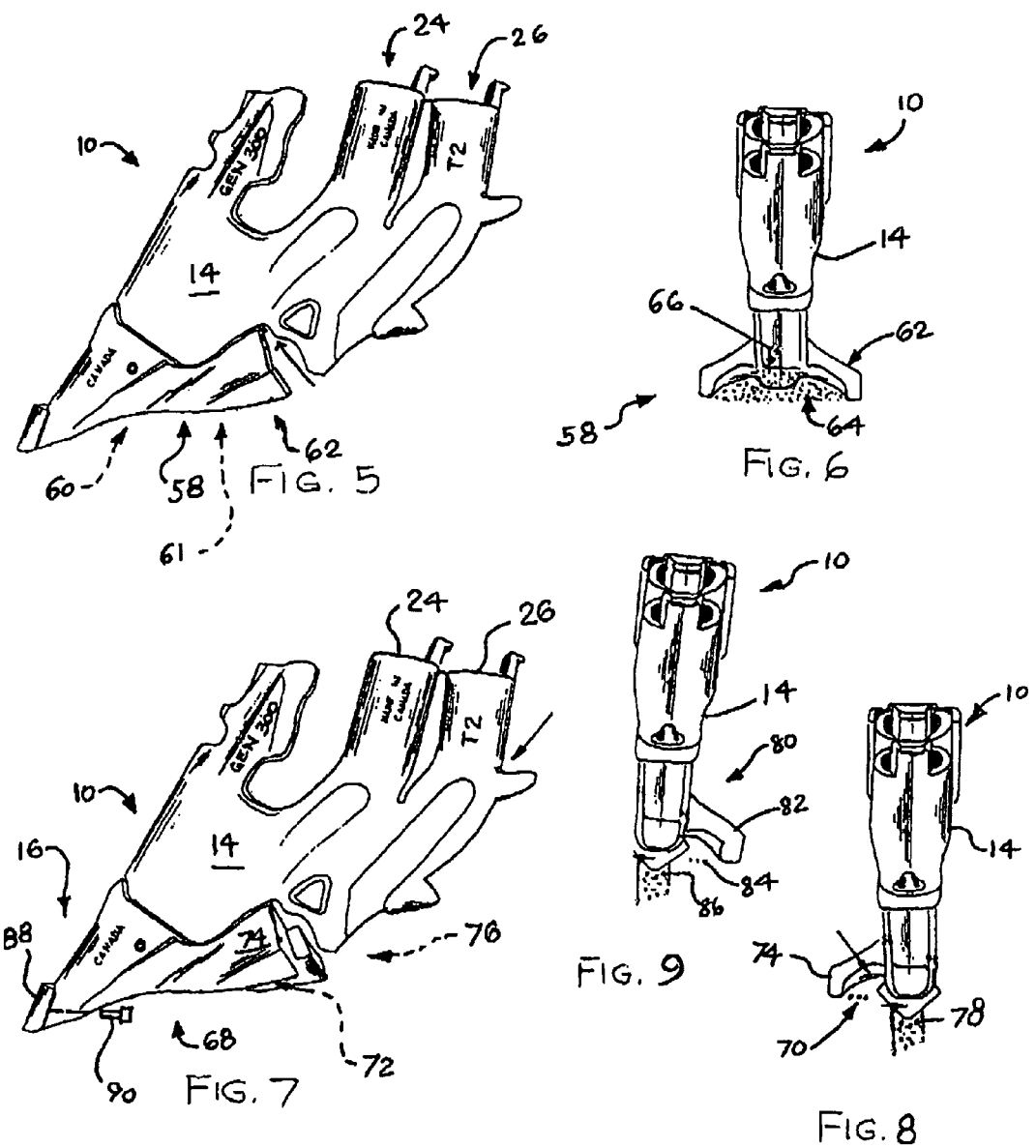

SEED BOOT OPENER HAVING INTERCHANGEABLE DISPENSERS

BACKGROUND OF THE INVENTION

1. Field of the Invention

The present invention relates to planting crops, and more particularly to a seed boot having an opener which offers interchangeable dispensing apparatus for discharging seed, fertilizer, and the like into the ground.

2. Description of the Related Art

Planting crops using a power drawn seed boot may entail different requirements depending upon the type of crop being planted, whether the farmer is undertaking single or multiple row planting, soil quality, and other variables. Seed boots must vary in their discharge capabilities accordingly. It would be possible to maintain one seed boot for each variety of planting. However, this increases the burden of a farmer's capital expenditures, and also complicates preparation for each successive planting where different seeding patterns must be practiced. The complication is that for each planting, a different seed boot may be required.

An example of a seed boot is shown in U.S. Pat. No. 6,745,705, incorporated herein by reference.

SUMMARY OF THE INVENTION

The present invention addresses the above problems by enabling a farmer to vary the exact nature and functions of a seed boot, so that only one seed boot need be maintained for farming. More specifically, modular or replaceable openers bearing nozzles or other discharging elements are interchangeably mountable on a seed boot. Each opener has a selected dispensing pattern. Preferably, a plurality of openers of different styles are provided, and may be attached to the same seed boot. It is considerably easier and less expensive to change nozzle bearing openers on a seed boot rather than the seed boot itself.

Changing openers rather than an entire seed boot enables ready conversion from single shoot to double shoot, single row planting to double row planting, or of course, conversions in the reverse order. Fertilizers may be dispensed separately from seed, if so desired.

BRIEF DESCRIPTION OF THE DRAWINGS

Further features of the present invention, as well as the advantages derived therefrom, will become clear from the following detailed description made with reference to the drawings in which:

FIG. 1 is a side elevational view of one embodiment of a seed boot according to the present invention, fitted with a first embodiment of a replaceable opener.

FIG. 2 is a rear elevational view of FIG. 1.

FIG. 3 is a side elevational view of the seed boot of FIG. 1, but shown fitted with a second embodiment of a replaceable opener.

FIG. 4 is a rear elevational view of FIG. 3.

FIG. 5 is a side elevational view of the seed boot of FIG. 1, but shown fitted with a third embodiment of a replaceable opener.

FIG. 6 is a rear elevational view of FIG. 5.

FIG. 7 is a partly exploded side elevational view of the seed boot of FIG. 1, but shown with a fourth embodiment of a replaceable opener.

FIG. 8 is a rear elevational view of FIG. 7.

FIG. 9 is similar to FIG. 8, but shows an embodiment of the replaceable opener which is a mirror image of that of FIG. 8.

DESCRIPTION OF THE PREFERRED EMBODIMENTS

The documents, patents and patent applications referred to herein, including those pertaining to the prior art, are hereby incorporated by reference in their entirety.

FIG. 1 of the drawings shows a seed boot 10 according to the present invention, having an interchangeable dispensing opener 12 for discharging fluent materials such as seed and other substances into the ground. Seed boot 10 comprises a body 14 having a pointed leading end 16, a right side 18 (not visible in FIG. 1, but seen from the end in FIG. 2) and a left side 20 (shown in full face in FIG. 1, but identified by reference numeral only in FIG. 2). Right side 18 and left side 20 are respectively the right and left surfaces of body 14 with respect to the forward direction indicated as arrow A, with pointed leading end 16 being the forwardmost part of seed boot 10 when being drawn by a tractor or the like (not shown) in actual use. Body 14 is a structural member which holds a draft apparatus engaging element 22, a first upwardly opening conduit 24, and a second upwardly opening conduit 26, as well as opener 12 together in operative position for use. Draft apparatus engaging element 22 is a generally conventional structure which receives that part of the draft apparatus (not shown) which connects seed boot 10 to, for example, a tractor or other equipment (not shown). First upwardly opening conduit 24 has a first internal passage which leads to a discharge point formed in body 12, and will ultimately communicate with opener 12. First upwardly opening conduit 24 includes a proximal end 30 bearing a connector or other suitable element for engaging a supply tube (not shown) which conducts seed or other fluent material (not shown) from a supply stored on the draft apparatus. First upwardly opening conduit 24 leads to a distal end 32 (concealed from view in FIGS. 1 and 2). Distal end 32 opens at the bottom of body 14 to a corresponding passage formed in opener 12, and will be described hereinafter. Second upwardly opening conduit 26 has a proximal end 34 which is generally similar in structure and function to proximal end 30 of first upwardly open conduit 24 and a distal end which is similar to that of first upwardly open conduit 24 but is not specifically identified by reference numeral. First upwardly opening conduit 24 is intended to receive one fluent material, typically seed or fertilizer, while second upwardly opening conduit 26 is intended to receive a second fluent material. The passages of conduits 24 and 26 ultimately intercommunicate in an opener such as opener 12, but not within body 14 of seed boot 10. Depending upon the type of opener employed, the fluent materials being dispensed are either segregated from one another as they are discharged or are mixed together prior to being discharged, as will be described further hereinafter.

Seed boot 10 has a fastener such as bolt 36 disposed to secure dispensing opener 12 in removable and replaceable fashion to body 14 of seed boot 10 in a position to dispense fluent materials from body 14 of seed boot 10. Bolt 36, which may of course take many different forms, and which may be tool driven or in some embodiments (not shown) may be manually installed and removed, is shown representatively in FIG. 1 for clarity. In practice, it is contemplated that a location less exposed to soil moving past seed boot 10 would be preferable. Such a location could for example be beneath body 12. It will be appreciated that openers in other embodiments may be fastened similarly.

Opener 12 of FIG. 1 is of the paired or double row, double shoot point type. That is, opener 12 has a first internal passage which communicates with the distal end of the passage associated with first upwardly opening conduit 24 branches internally within opener 12, and leads to the right and left sides of body 14. This is better seen in the rear view of FIG. 2. The embodiment of opener 12 depicted in FIG. 2 includes a right side projection or nozzle 38 enclosing a right side branch of the internal passage and a left side projection or nozzle 40 enclosing a left side branch of the internal passage. The branched passage terminates at a right side opening 42 and a left side opening 44. Although this symmetrical construction is presently preferred, other arrangements for discharging one fluent material in two spaced apart rows may be provided as desired.

Openings 42 and 44 discharge seeds 46A, 46B, respectively. A second internal passage formed in opener 12 opens at the upper or proximal end to the distal end of the passage associated with the second upwardly opening conduit 26 of seed boot 10. The second internal passage opens at an opening 48. When openings 42, 44 are used to dispense seeds 46A, 46B, opening 48 is typically used to dispense fertilizer 50.

FIGS. 3 and 4 show seed boot 10 fitted with a second type of opener. Opener 52 is of the narrow broadcast pattern, single shoot style. One of the upwardly opening conduits 24, 26, preferably front upwardly opening conduit 24, is not used when opener 52 is employed. A fluent material, such as mixed seed and fertilizer, is connected only to rear upwardly opening conduit 26. Opener 52 has an internal passage which opens only to the distal end of the passage associated with upwardly opening conduit 24, and which discharges at a single, central nozzle 54 below body 14 of seed boot 10. The narrow broadcast pattern of discharged fluent material is indicated at 56. Again, although symmetrical construction of opener 52 is preferred, it would be possible to arrange nozzle 54 to discharge to the right or to the left of body 14 if desired. It is also possible to vary the nozzle such that the resultant broadcast pattern is wide, with fluent material being discharged in a continuous band from the right continuously to the left of body 14.

Referring now to FIG. 5, in a further embodiment of the invention, seed boot 10 is fitted with a removable dispensing opener 58. Opener 58 has a first internal passage 60 opening to the distal end of first upwardly open conduit 24 and a second internal conduit 61 opening to the distal end of second upwardly open conduit 26. Internal passage 60 of opener 58 leads to and terminates at a wide broadcast angle ribbon seeding nozzle 62 (see also FIG. 6) which is dimensioned and configured to discharge fluent material from the left side of body 14 of seed boot 10 continuously to the right side thereof, having a wide slotted opening which deposits fluent material such as seed 64 as shown in FIG. 6. Second internal conduit 61 has a discharge opening 66 at the bottom of body 14 of seed boot 10.

FIG. 7 shows a still further embodiment of the invention wherein seed boot 10 is fitted with an opener 68 which, as best seen in FIG. 8, dispenses seed 70 to the left side of seed boot 10. To this end, opener 68 has a first discharge passage 72 which is disposed in fluid communication with the distal end of upwardly opening conduit 24, leads to the right side of seed boot 10, and terminates in a discharge nozzle 74 which is disposed to project to the right side of body 14 of seed boot 10. A second discharge passage 76 is disposed in fluid communication with the distal end of upwardly opening conduit 26, and opens at the bottom of body 14 of seed boot 10. A second fluent material such as fertilizer 78 is discharged from second discharge passage 76.

FIG. 9 shows a scheme generally similar to that of FIGS. 7 and 8, but with discharge from upwardly opening conduit 24 being arranged to the right side of seed boot 10. Structural and functional features of opener 80 are generally mirror images of those of opener 68 of FIG. 7. In the embodiment of FIG. 9, opener 80 has a removable dispensing opener 80 bearing a nozzle 82 located at and disposed to discharge fluent material such as seed 84 at the left side of body 14 of seed boot 10. A second passage (not shown) of opener 80 communicates with the distal end of second upwardly opening conduit 26 and discharges a second fluent material such as fertilizer 86 at the bottom of body 14 of seed boot 10.

It will be appreciated that seed boot 10 is common to all embodiments of openers, and differs from prior art seed boots (not shown) in that seed boot 10 cooperates with and is fastenable to a selected opener. Seed boot 10 has two fluid conduits, both of which both or alternatively only one of which may be active, depending upon the opener selected for installation on seed boot 10.

Referring to FIG. 7, regardless of the style of opener, seed boot 10 is preferably provided with a cutting insert 88 removably mountable on pointed leading end 16 of body 10. Cutting insert 88 provides a replaceable blade which may be replaced from time to time with wear without requiring that the entire seed boot 10 be replaced each time the front end thereof dulls. A fastener such as screw 90 is disposed to removably secure cutting insert 88 to body 14 of seed boot 10. Cutting insert 88 may be of conventional type and may be conventionally fastened to seed boot 10.

It is to be understood that discharge locations for fluent material received from upwardly opening conduit 26 may be varied in size, configuration, and location from those shown herein. In particular, discharge locations may be displaced forwardly, rearwardly, upwardly, or downwardly from the locations shown at the bottom of body 14 of seed boot 10.

While the invention has been specifically described in connection with certain specific embodiments thereof, it is to be understood that this is by way of illustration and not of limitation, and the scope of the appended claims should be construed as broadly as the prior art will permit.

What is claimed is:

1. A seed boot for discharging fluent materials into the ground, comprising:

a body of unitary construction having a pointed leading end, a right side and a left side located respectively to the right and left of said pointed leading end, a draft apparatus engaging element, said body further including a first upwardly opening conduit having a proximal end for engaging a supply tube and a distal end opening at a bottom of said body, and a second upwardly opening conduit having a proximal end for engaging a supply tube and a distal end opening at the bottom of said body;

an interchangeable dispensing opener of unitary construction secured to the pointed leading end of said body in a position to discharge fluent material from said body of said seed boot, and a fastener disposed to removably secure said interchangeable dispensing opener to said body of said seed boot; and a removable and replaceable cutting insert secured to the pointed leading end of said body, and a second fastener disposed to removably secure said cutting insert to said body of said seed boot.

2. The seed boot according to claim 1, wherein said interchangeable dispensing opener further comprises a first nozzle having a proximal end disposed to establish fluid communication with said distal end of said first upwardly opening conduit and a distal end projecting towards said right side of said body of said seed boot, and a second nozzle having a proximal end disposed to establish fluid communication with said distal end of said first upwardly opening conduit and a distal end projecting towards said left side of said body of said seed boot.

3. The seed boot according to claim 1, wherein said interchangeable dispensing opener further comprises a nozzle having a first proximal end disposed to establish fluid communication with said distal end of said first upwardly opening conduit, and a distal end which is disposed to discharge fluent materials from the bottom of said body of said seed boot.

4. The seed boot according to claim 1, wherein said interchangeable dispensing opener further comprises a first passage communicating with said first upwardly opening conduit of said seed boot and terminating at a ribbon seeding nozzle having a discharge opening dimensioned and configured to discharge fluent material from said left side of said body of said seed boot continuously to said right side of said body of said seed boot, and a second passage communicating with said second upwardly opening conduit of said seed boot, having a discharge opening at the bottom of said body of said seed boot.

5. The seed boot according to claim 1, wherein said interchangeable dispensing opener further comprises a first passage disposed in fluid communication with said distal end of said first upwardly opening conduit of said seed boot and a second passage disposed in fluid communication with said distal end of said second upwardly opening conduit of said seed boot, wherein said first passage leads to the right side of said seed boot and terminates in a discharge nozzle disposed to discharge fluent material at the right side of said body of said seed boot, and said second passage opens at the bottom of said body of said seed boot.

6. The seed boot according to claim 1, wherein said interchangeable dispensing opener further comprises a first passage disposed in fluid communication with said distal end of said first upwardly opening conduit of said seed boot and a second passage disposed in fluid communication with said distal end of said second upwardly opening conduit of said seed boot, wherein said first passage leads to the left side of said seed boot and terminates in a discharge nozzle disposed to discharge fluent material at the left side of said body of said seed boot, and said second passage opens at the bottom of said body of said seed boot.

* * * * *